(12) United States Patent
Moskovich et al.

(10) Patent No.: US 6,907,008 B1
(45) Date of Patent: Jun. 14, 2005

(54) METHOD FOR A NETWORK DEVICE INSERTED BETWEEN POINT TO POINT CONNECTED STATIONS TO AUTOMATICALLY NEGOTIATE COMMUNICATION PARAMETERS BETWEEN THE STATIONS

(75) Inventors: Reuven Moskovich, Tel Aviv (IL); Yuval Shvirsky, Holon (IL); Arie Trost, Walnut Creek, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/469,982

(22) Filed: Dec. 21, 1999

(51) Int. Cl.[7] ............................................... H04L 12/26
(52) U.S. Cl. ...................... 370/241; 370/465; 709/224; 709/239; 714/41
(58) Field of Search ................................ 370/238, 340, 370/477, 282, 280, 445, 446, 465, 466, 438, 447, 401, 296, 276, 294, 462, 220, 242, 449, 241; 709/223, 224, 239; 375/293, 220, 359; 455/78; 398/9; 714/41

(56) References Cited

U.S. PATENT DOCUMENTS

| | | | | |
|---|---|---|---|---|
| 5,586,117 A | * | 12/1996 | Edem et al. ................. | 370/466 |
| 5,898,837 A | * | 4/1999 | Guttman et al. ............. | 709/224 |
| 5,922,052 A | * | 7/1999 | Heaton ........................ | 709/223 |
| 5,953,340 A | * | 9/1999 | Scott et al. .................. | 370/465 |
| 6,047,321 A | * | 4/2000 | Raab et al. .................. | 709/224 |
| 6,198,727 B1 | * | 3/2001 | Wakeley et al. ............. | 370/282 |
| 6,233,613 B1 | * | 5/2001 | Walker et al. ............... | 709/224 |
| 6,441,931 B1 | * | 8/2002 | Moskovich et al. ........... | 398/9 |
| 6,457,055 B1 | * | 9/2002 | Hwong et al. ............... | 370/282 |
| 6,504,849 B1 | * | 1/2003 | Wang et al. ................. | 370/477 |

* cited by examiner

Primary Examiner—Duc Ho
Assistant Examiner—Phuongchau Ba Nguyen
(74) Attorney, Agent, or Firm—Blakely, Sokoloff, Taylor & Zafman, LLP

(57) ABSTRACT

A network probe inserted between two nodes in point-to-point link synchronizes modes of operation between the two nodes. The probe utilizes IEEE 802.3u Clause 28 Auto-Negotiation to detect and advertise corresponding information regarding modes of operation for the nodes between which it is inserted in the point-to-point link, to achieve a highest priority common mode of operation between the nodes.

14 Claims, 9 Drawing Sheets

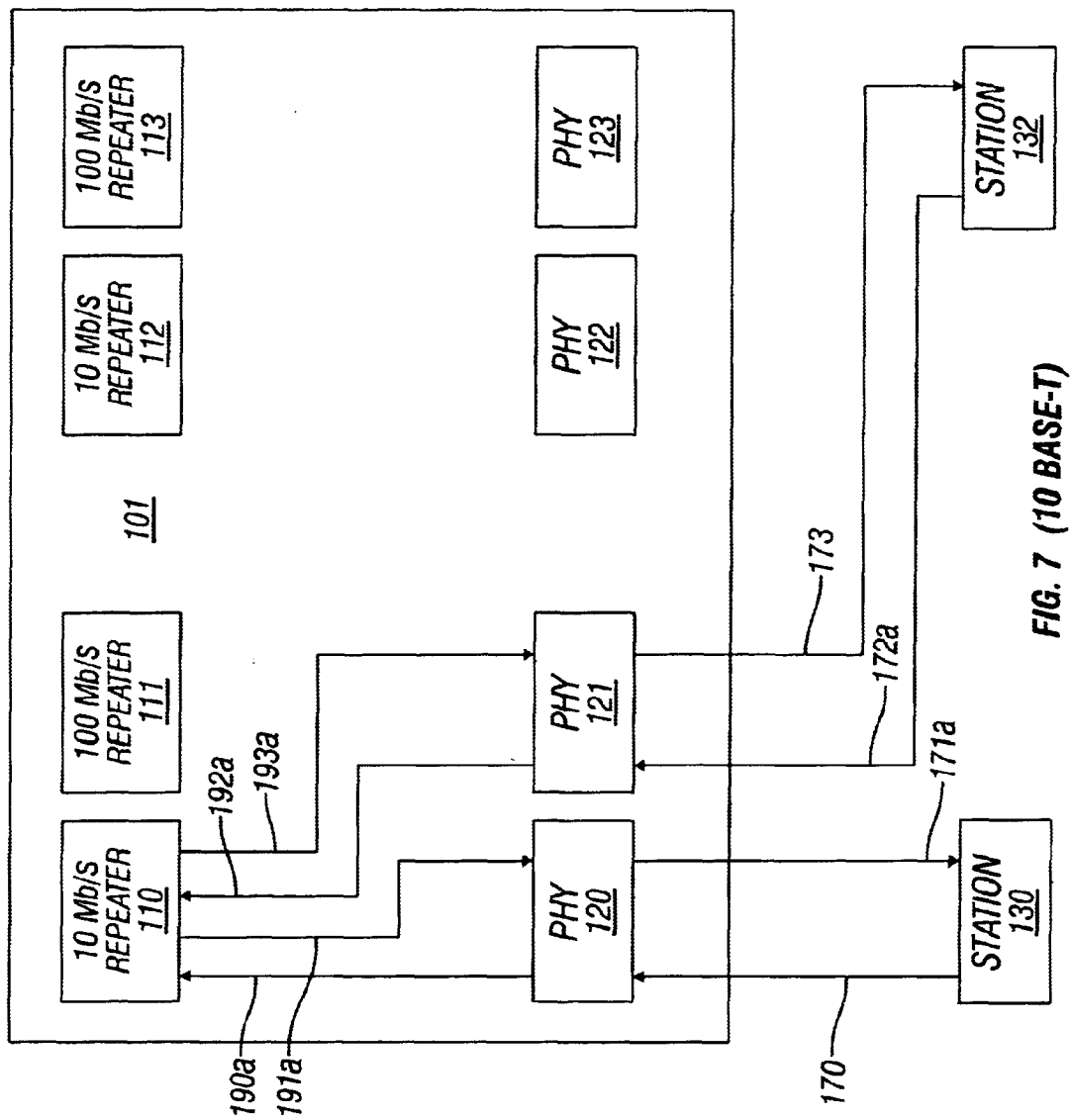
FIG. 7 (10 BASE-T)

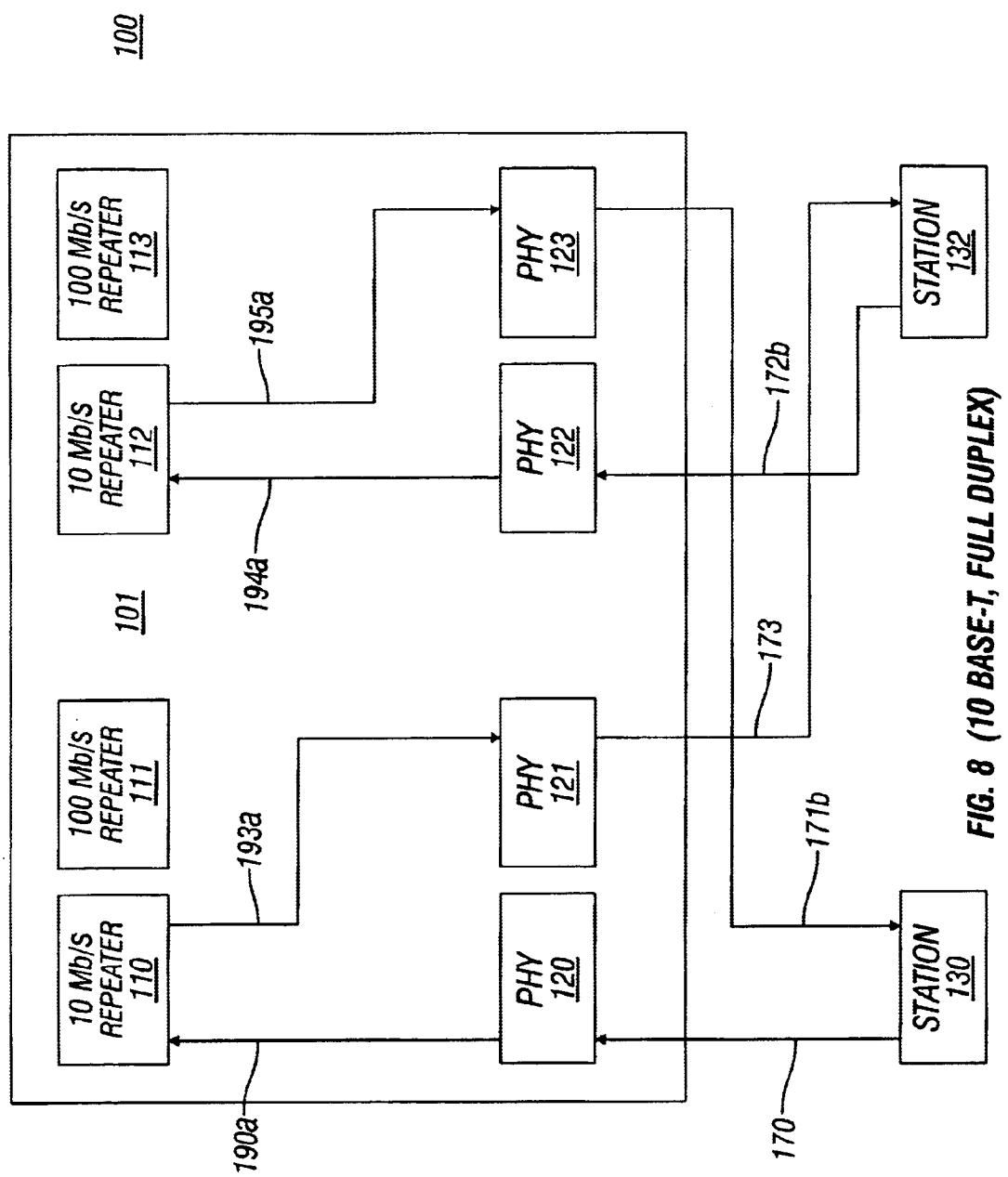
FIG. 8 (10 BASE-T, FULL DUPLEX)

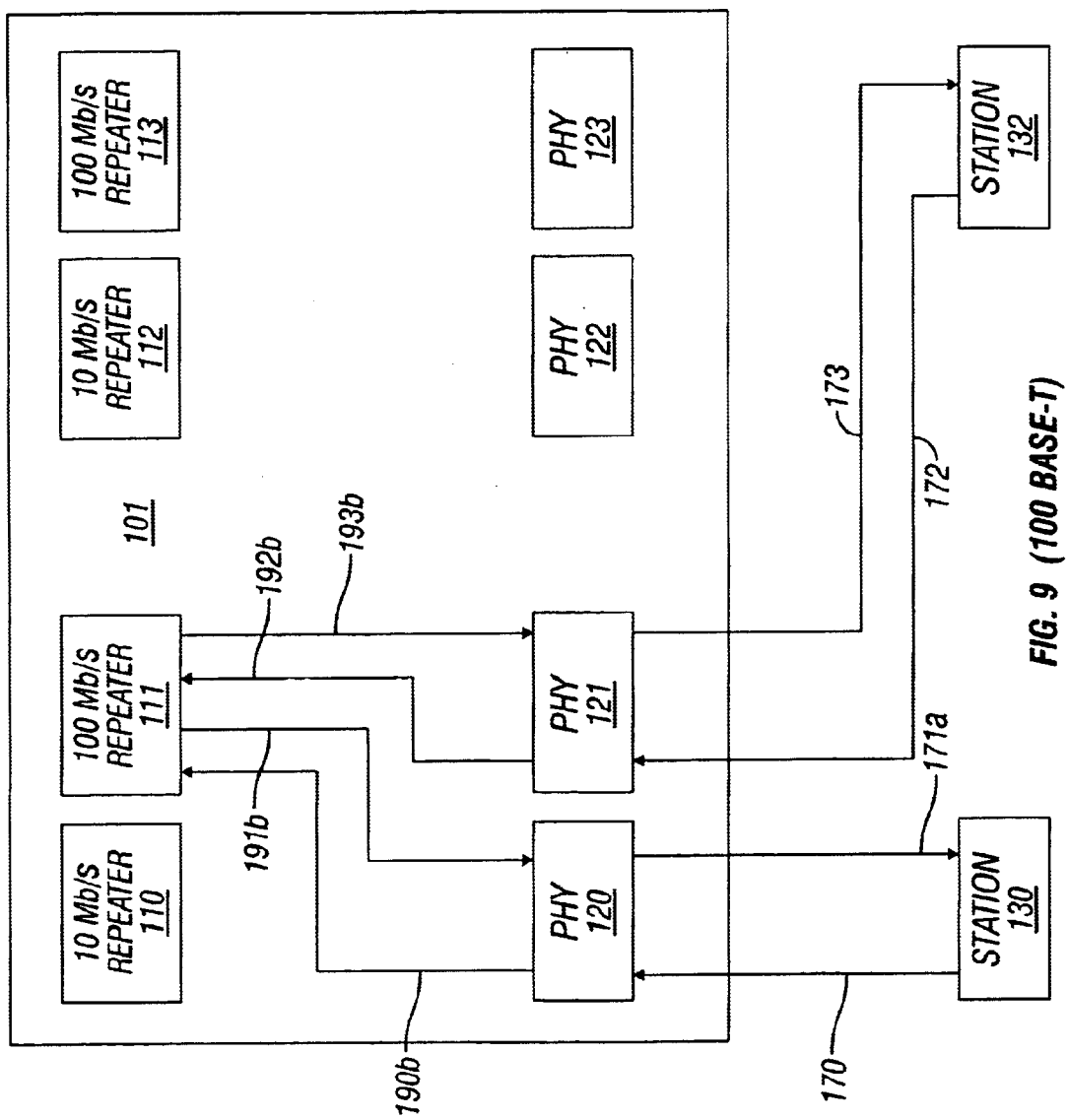
FIG. 9 (100 BASE-T)

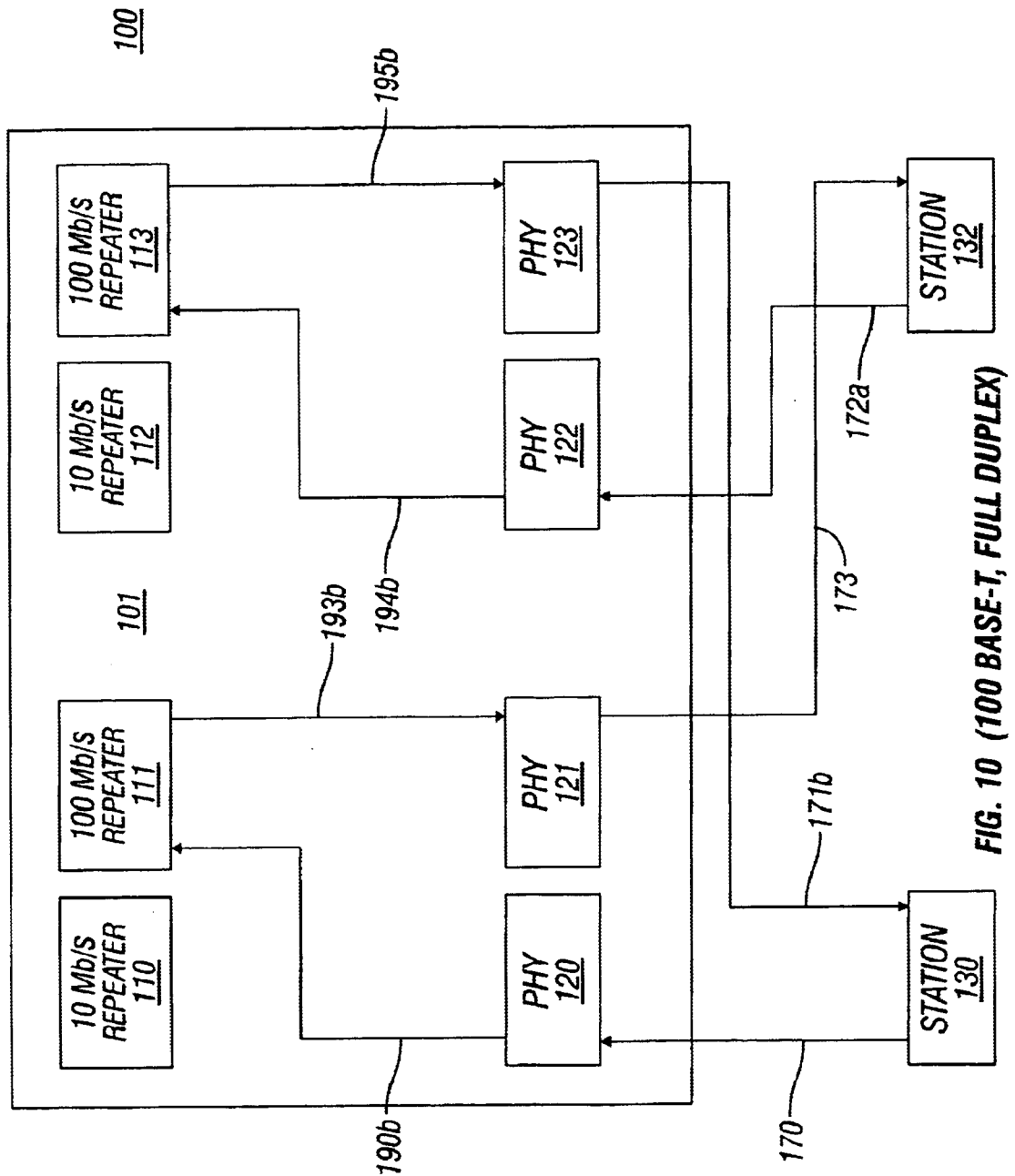
FIG. 10 (100 BASE-T, FULL DUPLEX)

METHOD FOR A NETWORK DEVICE INSERTED BETWEEN POINT TO POINT CONNECTED STATIONS TO AUTOMATICALLY NEGOTIATE COMMUNICATION PARAMETERS BETWEEN THE STATIONS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention relates to data networking. In particular, the present invention relates to a method and apparatus for a network probe to synchronize enhanced modes of operation between two nodes connected via a point-to-point link, into which link the network probe is inserted.

2. Description of the Related Art

With reference to FIG. 1, prior art data networks generally utilized one or more shared media hubs, e.g., hub 10. Multiple nodes, or end user workstations, e.g., workstations 1, 2 and 3, were coupled to a shared communications that was, in turn, coupled to a port on the shared media hub. The hub 10 had multiple ports (e.g., ports 11, 21, 31), each coupled to a different shared communications medium. High end workstations, or servers, such as file servers or print servers, were also coupled via a dedicated or shared communications medium to a port on the shared media hub.

As the applications running on these data networks became more mission critical, and bandwidth utilization of the shared communications media increased, it became advantageous to monitor, for example, the performance and the error rates of data traffic on the shared communications media to facilitate proper operation of the data network. To accomplish this monitoring, network monitoring devices were configured into shared media hubs, or coupled to the port (41) of a shared media hub via a communications medium (40) as stand-alone devices (e.g., probe 4). In either configuration, the monitoring devices were typically referred to as probes. The probes would promiscuously monitor the data traffic on all shared communications media in the network and look at, for example, performance and error statistics, data traffic patterns and typical data flows across the shared communications media.

As shown in FIG. 2, as performance requirements of prior art data networks continued to increase, and additional performance intensive applications were employed, the shared communications media coupled to the shared media hubs were typically divided into multiple network segments (e.g., network segments 201, 202 and 203) to reduce data traffic on each segment, although all network segments were still in the same collision domain, i.e., the network segments were not electrically isolated. Data communication between these segments generally utilized well known backbone, rather than switching, technology.

As performance requirements continued to increase to meet traffic demands, switches such as switch 220 illustrated in FIG. 2 were used to segment the network into multiple collision domains. Segmenting the network into multiple collision domains prevented a data packet from one segment (e.g., segment 201) traversing the network to another segment (e.g., segment 202) unless the data packet was destined to a particular device on the other segment. Such a determination was based, for example, on a destination address specified in the data packet.

The problem, however, in monitoring network performance in such an environment utilizing probes was that a single probe was required for each segment in order to promiscuously monitor the data traffic on that segment. With reference to FIG. 3, as the data networks became highly segmented, it became evident that it was impractical to attach a probe to each segment in the network to promiscuously monitor all traffic. Rather, network administrators tended to concentrate probing activities to highly concentrated server farms or segments in the network where the traffic was the busiest, for example, a segment from a switch to a file server. These file servers were typically coupled via a dedicated point to point communications medium to a port on a switch to provide, for example, a data communications rate of 10 megabits per second, 100 megabits per second, or even 1000 megabits per second, to the file server. Connecting the file server using a dedicated point to point communications medium to the switch 220 formed a single station network segment. In a single station network segment, it was impossible to attach a probe to that segment to promiscuously monitor network traffic because only a single port was necessarily available for coupling the segment to the switch. To overcome this limitation, a multiport repeater was inserted between the switch and the file server, e.g., repeater 233 between workstation 3 and switch 220 in FIG. 3, thereby providing additional ports (on the inserted multiport repeater) to facilitate connection of a probe (e.g., probe 235) into the segment.

Although switch 220 in FIG. 3 shows only six ports for purposes of illustration, it is understood that a switch may have sufficient ports to support, for example, ten, twenty, or more servers. In such a situation, it becomes impractical to attach a repeater between every server and switch port to promiscuously monitor data traffic, due to the increased cost, space, and asset management responsibilities encountered as a result of the additional equipment. In addition, for each communications medium that was to be monitored, that network segment would have to be taken down, the server disconnected from the switch, the repeater inserted into the communications medium, and the server communication reestablished. This process would be highly disrupting to data communications in the network. Moreover, in attempting to diagnose a performance problem, one would be required to shut down the network segment, insert a repeater, and couple a probe to the repeater in order to collect monitoring data. By the time the probe was operable, the performance problem may well have disappeared.

With reference to FIG. 4, a prior art probe as may be utilized in a typical switched data networking environment is illustrated. Multiple network segments 201, 202 and 203 are coupled to a shared media hub 200. Each segment is connected to separate modules 204, 205 and 206, respectively, within the hub. Each of the hub modules are coupled via a dedicated communications medium 401, 402 and 403 to an individual port 404, 405 and 406 on a switch 220. (Alternatively, segments 201, 202 and 203 may each be a dedicated communications medium, in which case, the segments would be directly coupled to respective ports 404, 405 and 406 on switch 220.) Ports on the switch are additionally shown connected either to a dedicated network device, e.g., device 2 (perhaps an end user workstation or a server), or connected to prior art probe 400. More specifically, a port (e.g., port 407) on the switch may be connected to a port (e.g., port 408) on the probe. Another port (409) on probe 400, in turn, is coupled to a network device such as workstation 1. While the network device illustrated is a workstation, it is appreciated that the network device may be another switch, a server, or other network device. Probe 400 includes circuitry for repeating data packets between the switch and the network devices coupled to the probe.

The probe 400 utilizes internal bypass circuitry in promiscuously monitoring the communications medium coupling network devices 1 and 3 to the probe. The probe promiscuously monitors all traffic between the hub 200 and switch 220 destined for or received from either network device 1 or network device 3. All data traffic is captured, and potentially saved, e.g., for some form of analysis or statistical compilation. The probe analyzes those packets according to, for example, the remote monitoring standards RMON I or II. These standards promulgate, for example, specific statistical characteristics, such as user history, performance and error rates and traffic patterns between different workstations on the network across all layers of the International Standards Organization (ISO) Open Systems Interconnection (OSI) seven layer networking model.

Today, network devices, or nodes, are capable of operating in any one of a number of modes, defined in terms of the media type(s) over which the nodes transmit and receive data, the speed of the data transmission, full or half duplex communication of the data, etc. Thus, IEEE Standard 802.3u, clause 28, provides for Auto-Negotiation. Auto-Negotiation allows a device connected at one end of a point to point communications medium to advertise modes of operation of which it is capable to a device at the opposite end of a point to point link, and to detect corresponding information that the other device may be advertising. However, when a prior art probe is inserted between such nodes in a point to point link, the nodes are no longer able to directly negotiate the highest common mode of operation between them by means of the Auto-Negotiation function. What is needed is an improved network probe that negotiates and synchronizes enhanced modes of operation between two nodes connected via a point-to-point link, into which link the network probe is inserted.

BRIEF SUMMARY OF THE INVENTION

Described is a method and apparatus for a network probe inserted between two nodes in point-to-point link to synchronize enhanced modes of operation between the two nodes. The probe utilizes IEEE 802.3u Clause 28 Auto-Negotiation to detect and advertise corresponding information regarding modes of operation for the nodes between which it is inserted in the point-to-point link, to achieve a highest priority common mode of operation between the nodes.

BRIEF DESCRIPTION OF THE SEVERAL VIEWS OF THE DRAWINGS

The present invention is illustrated by way of example and not limitation in the following figures. Like references indicate similar elements, in which:

FIG. 7 is a block diagram of a network probe configuration according to one state of the finite state machine depicted in FIG. 5.

FIG. 8 is a block diagram of a network probe configuration according to one state of the finite state machine depicted in FIG. 5.

FIG. 9 is a block diagram of a network probe configuration according to one state of the finite state machine depicted in FIG. 5.

FIG. 10 is a block diagram of a network probe configuration according to one state of the finite state machine depicted in FIG. 5.

DETAILED DESCRIPTION OF THE INVENTION

The present invention provides a method and apparatus embodied in a network probe inserted between two nodes connected via a point-to-point link for negotiating and synchronizing enhanced modes of operation between the two nodes. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexors, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 1:
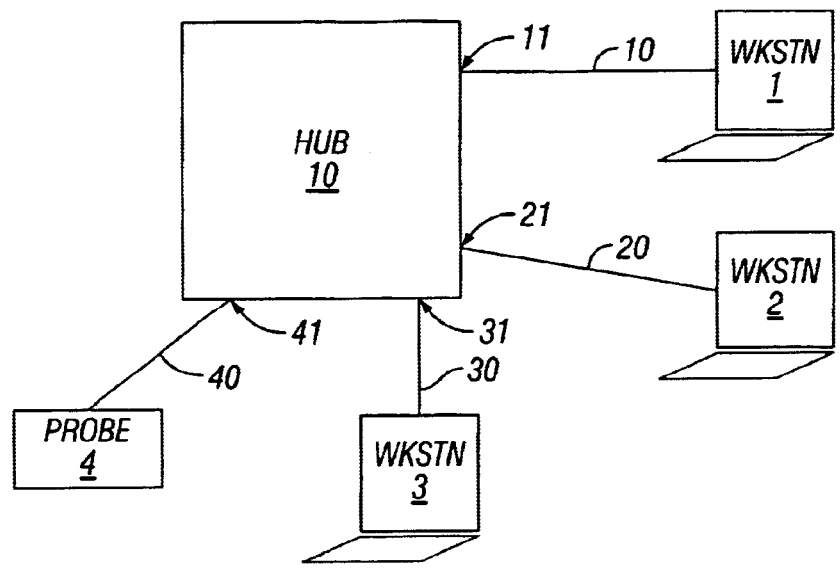
FIG. 1 is an illustration of a data network utilizing a shared communications media hub.
Figure 2:
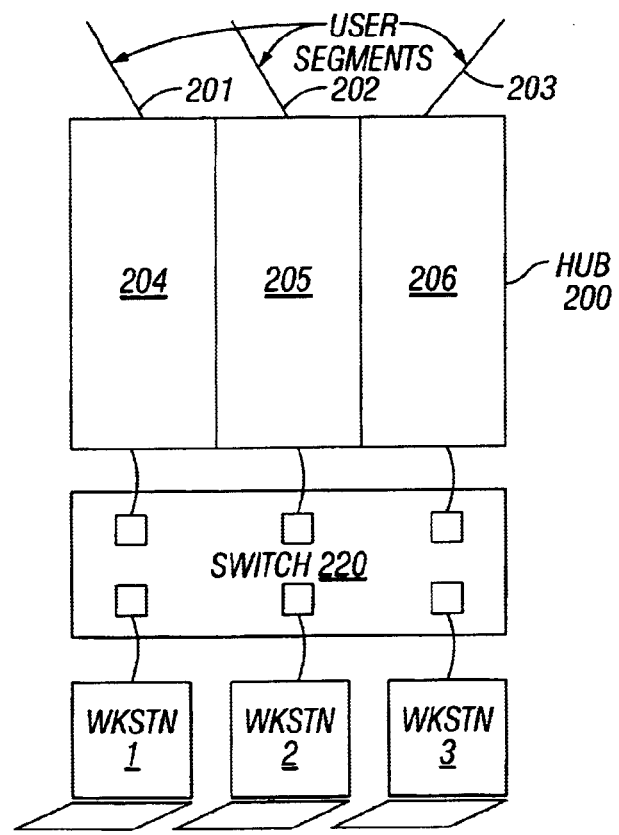
FIG. 2 is an illustration of a data network utilizing a switching hub (switch) to provide a dedicated communications medium to a network device.
Figure 3:
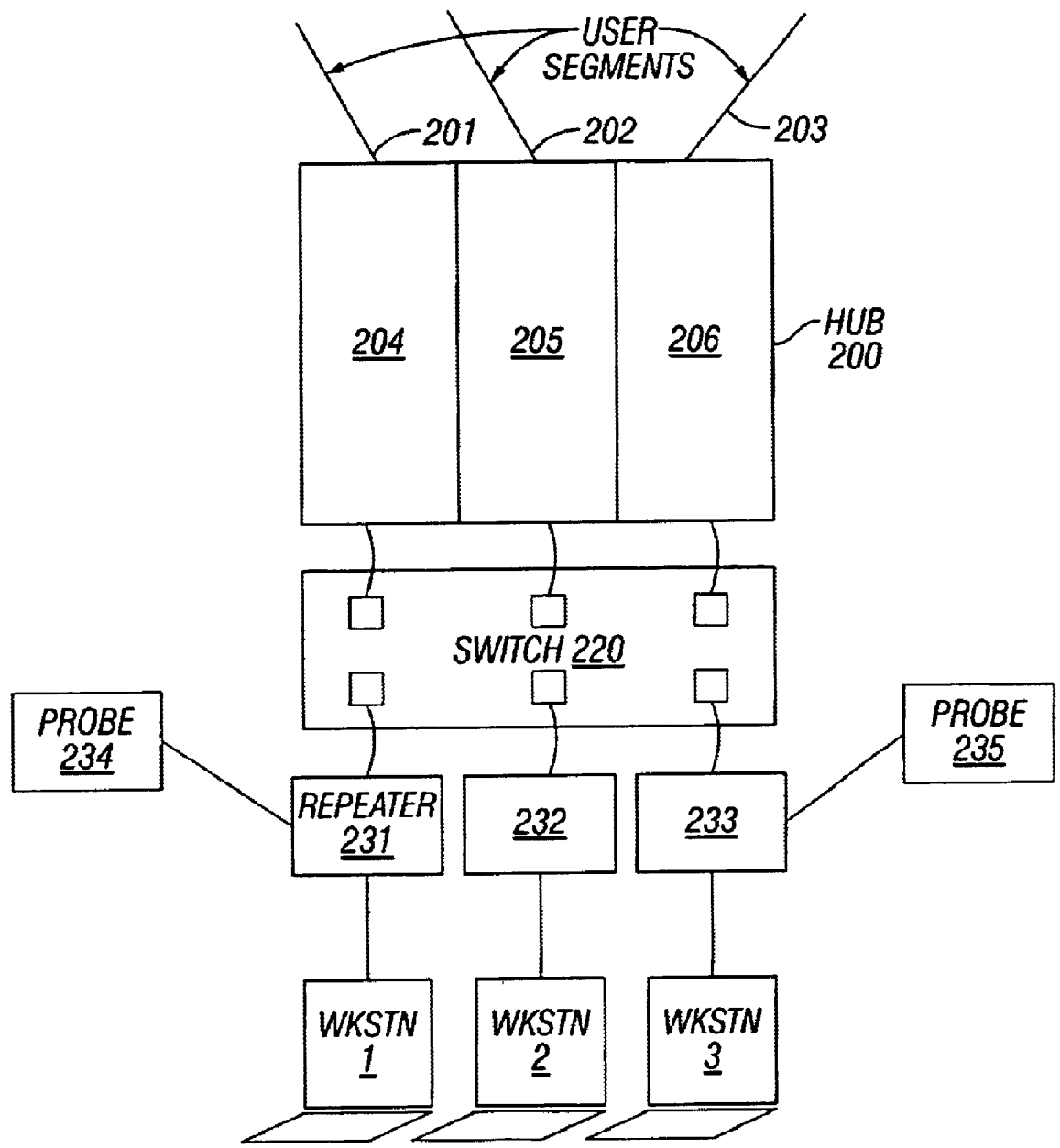
FIG. 3 is an illustration of a prior art method of monitoring performance in a data network utilizing a repeater coupled to each network device.
Figure 4:
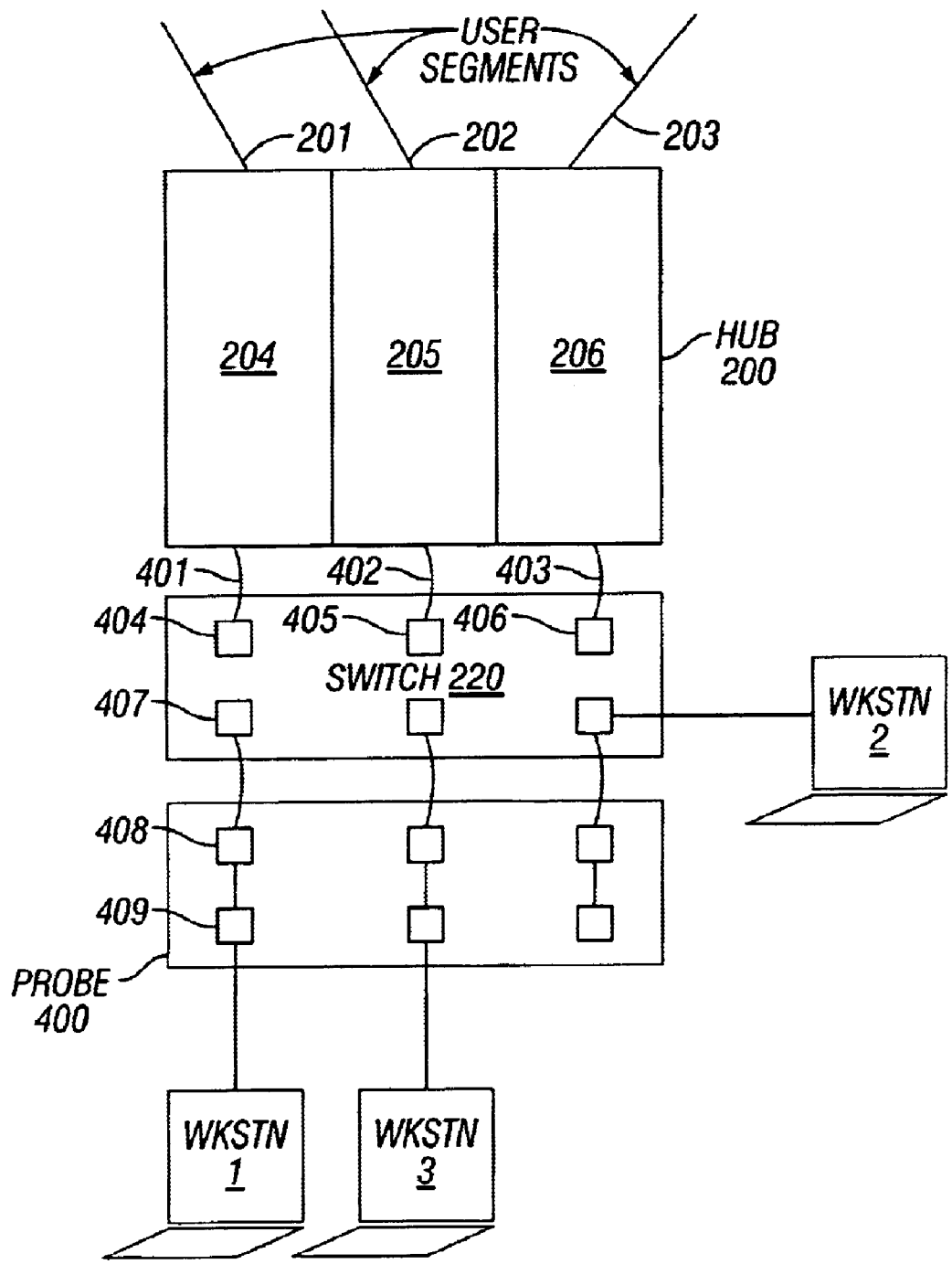
FIG. 4 is an illustration of a prior art network probe.
Figure 5:
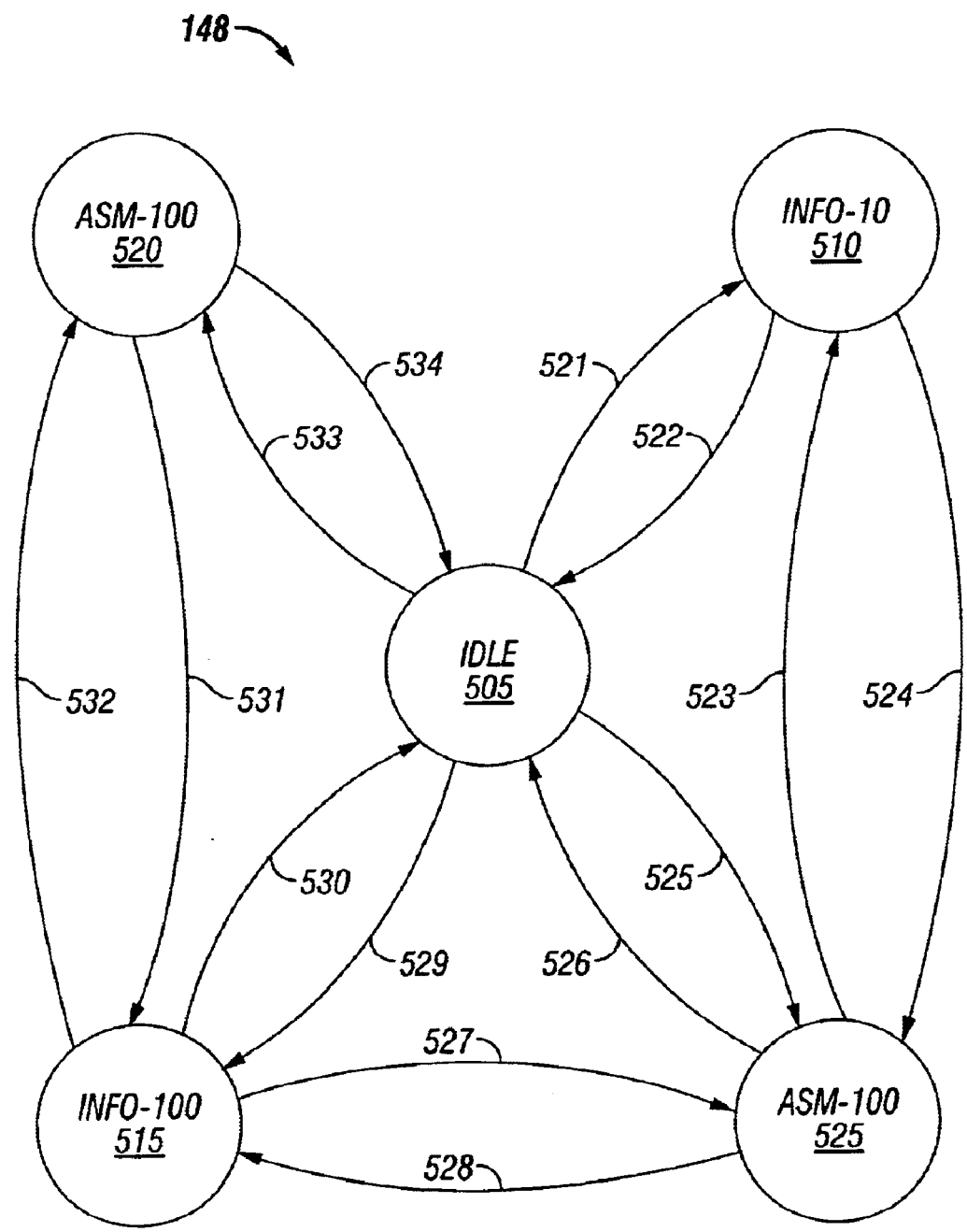
FIG. 5 is a diagram of a finite state machine embodying the present invention.

With reference to FIG. 5, a diagram of a finite state machine 500 embodied by the present invention is provided. The finite state machine 500 negotiates and synchronizes enhanced modes of operation between two nodes connected via a point-to 10 point link. The finite state machine 500 is implemented at the network probe inserted between the two nodes to negotiate with each node between which it is inserted in accordance with the Auto-Negotiation function.

Pursuant to IEEE Std 802.3u, clause 28, the Auto-Negotiation function is used as the signaling method to automatically configure a preferred mode of operation between two CSMA/CD compatible network devices that use the 8 Pin Modular connector specified in ISO/IEC 8877 and that also encompass multiple operational modes. Annex IEEE Std 802.3u, draft 5.3, Jun. 12, 1995, section 28B.3 Priority Resolution, page 363, specifies the priority of modes of operation; they are:

1) 100Base-TX, full duplex,
2) 100Base-T4,
3) 100Base-TX,
4) 10Base-T, full duplex, and
5) 10Base-T.

Two nodes connected via a point-to-point link may negotiate the best common mode of operation between them, according to the above priority. In the prior art, the nodes are not able to do negotiate when a network probe is inserted therebetween. The finite state machine of the present invention, operating at the probe, makes Auto-Negotiation between the nodes possible notwithstanding the physical presence of the probe between the nodes. The finite state machine operating in the probe effectuates the transfer of information of availability of multiple modes of operation between the nodes in the point-to-point link.

Figure 6:
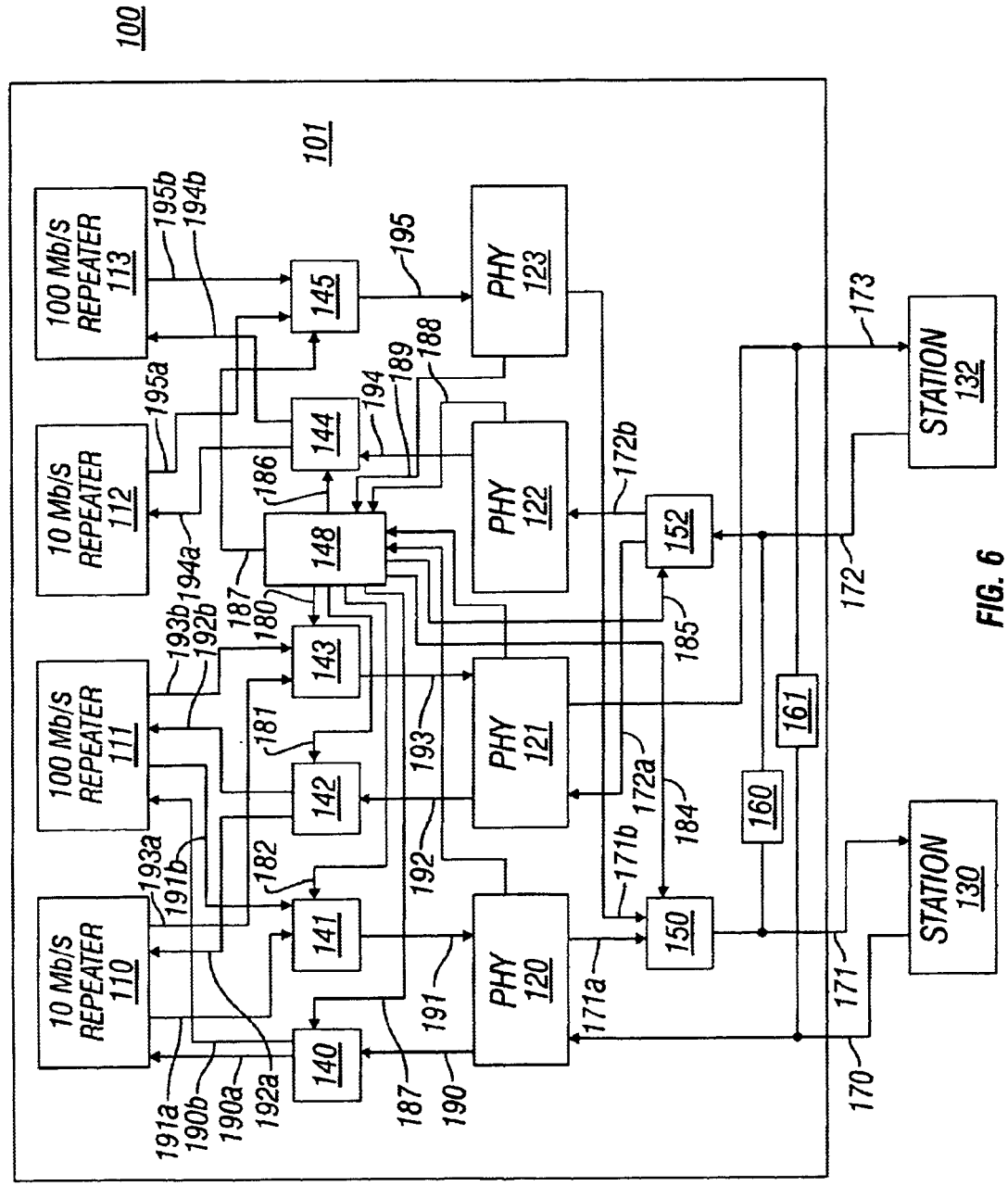
FIG. 6 is a block diagram of a network probe in accordance with an embodiment of the present invention

FIG. 6 illustrates a block diagram of a probe as may be utilized by an embodiment of the present invention. The probe 100 comprises a plurality of input/output ports, one input/output port 101 for each point-to-point link supported by the probe 100. Each input/output port 101, in turn, is divided into as many channels as there are possible common transmission speeds between the nodes. Each channel comprises a pair of repeaters for transmitting data at a data transmission speed that matches the data transmission speed of the network devices attached to the channel. Two repeaters are necessary to avoid collisions when operating in full duplex mode, i.e., when transmitting and receiving data from the attached nodes at the same time. Thus, for example, probe 100 comprises a channel defined by 10 million bits per second (10 Mb/s) repeaters 110 and 112 for receiving and transmitting data in accordance with the IEEE 802.3 CSMA/CD protocol/Ethernet protocol, as well as a channel defined by 100 Mb/s repeaters 111 and 113 for handling IEEE 802.3u CSMA/CD protocol/Fast Ethernet traffic between the nodes. It is appreciated that other channels/repeaters may be included in a channel depending on the need to support yet other protocols operating at different speeds.

Each repeater transfers data traffic between two physical layer (PHY) interfaces. For example, 10 Mb/s repeater 110 may receive and transmit data between PHYs 120 and 121 in half duplex (FIG. 7), or full duplex (FIG. 8). If operating in half duplex mode, each channel has one repeater operational between two PHYs, and one receive data channel and one transmit data channel operational per PHY. If operating in full duplex mode, each channel has two repeaters operational, each between two PHYs, and one receive or one transmit data channel operational per PRY.

With reference to FIGS. 5–10, an embodiment of the present invention is now described. Initially, the probe 100, in which an instance of a finite state machine 148 of the present invention is implemented, is powered off, and electromechanical relays 160 and 161 are in bypass mode, that is, the relays are closed so that data transmitted by stations 130 and 132 bypass the probe altogether. Upon power up, the PHYs are configured in accordance with normal startup procedures and become operational. The probe opens the relays so that it is in pass through mode, i.e., the relays are opened the so that data transmitted by stations 130 and 132 pass through the probe for monitoring. Each PHY to which a station is attached performs Auto Negotiation with the station in accordance with IEEE 802.3u clause 28. For example, PHY 120 performs Auto-Negotiation with station 130, and PHY 121 performs Auto-Negotiation with station 132. After Auto Negotiation is complete, the finite state machine 148 has obtained the mode of operation from each PRY and compares the modes of operation for each station negotiated by the respective PHY to which the station is coupled. The finite state machine then enables the appropriate repeaters and paths between the PHYs to monitor the traffic as it passes through the probe, based on the modes of operation negotiated between the PHYs and the stations to which they are attached.

Probe 100 comprises multiple pass through ports. A single pass through port 101 is illustrated in FIG. 6. One pass through port is capable of interconnecting two nodes to form a point to point link that may be monitored by the probe when powered up, or which bypasses the probe if the probe is powered off. A station 130 is initially coupled to PHY 120 via a receive data line 170 and transmit data line 171a. Transmit data line 171a may be switched for transmit data line 172b by switch 150 to transmit data from PHY 123 via line 171b depending on whether station 130 is capable of transmitting and receiving data in full duplex, as determined by Auto-Negotiation. If station 130 operates in full duplex, switch 150 is controlled by finite state machine (FSM) 148 to couple the transmit line 171b from PHY 123 to station 130. If station 130 operates in half duplex, FSM 148 controls switch 150 to couple the transmit line 171a from PHY 120 to station 130 for half duplex operation.

A station 132, at the other end of the point to point link from station 130, is initially coupled to PHY 121 via transmit data line 173 and receive data line 172a. Receive data line 172a may be switched by switch 152 in favor of receive data line 172b between PHY 122 and station 132 depending on whether station 132 is capable of transmitting and receiving data in full duplex. If station 132 operates in full duplex, switch 152 is controlled by finite state machine (FSM) 148 to couple PRY 122 to station 132 via receive data line 172b. If station 132 operates in half duplex, FSM 148 controls switch 152 to couple PHY 121 to station 132 via receive data line 172a. Thus, switches 150 and 152 control the selection of PHYs with which stations 130 and 132 transmit and receive data depending on the duplex mode of operation of the stations. More particularly, FSM 148 controls PHYs so that full duplex or half duplex communication is established between nodes 130 and 132. If both nodes can support full duplex communication, then full duplex communication is established. If one or both nodes can support only half duplex communication, then half duplex communication is established, as that is the best common mode of operation between the two nodes.

Switches 140–145 are controlled by FSM 148 to utilize certain of repeaters 110–113 depending on the mode of operation of nodes 130 and 132. If, for example, half-duplex, 10 Mb/s transmission speed is the highest common mode of operation between nodes 130 and 132, FSM 148 controls, in addition to enabling appropriate ones of PHYs 120–123 as described above, selecting appropriate ones of repeaters 110–113. In particular, repeater 110 is enabled by selecting receive data line 190a at switch 140, and transmit data line 191a at switch 141, receive data line 192a at switch 142, and transmit data line 193a at switch 143. All other lines at all other switches 140–145 are disabled. FIG. 7 illustrates the circuitry depicted in FIG. 6 that is utilized by probe pass through port 101 for exchanging data between nodes 130 and 132 at a particular data transmission speed (10 Mb/s) and in half duplex. For purposes of illustration, the switches that effect the circuitry used are not included in the drawing.

If, on the other hand, full duplex, 10 Mb/s transmission speed is the highest common mode of communication between nodes 130 and 132, FSM 148 enables the appropriate paths between PHYs 120–123 and repeaters 110 and 112. Both 10 Mb/s repeaters are used to avoid collisions that would otherwise occur if both stations concurrently transmitted data to the same repeater. In particular, receive link 190a between PHY 120 and repeater 110 is enabled by switch 140, transmit data link 193a is enabled between PHY 121 and repeater 110 by switch 142, receive data link 194a is enabled between PHY 122 and repeater 112 by switch 144, and transmit data link 195a is enabled between repeater 112 and PHY 123 by switch 145. The enabled circuitry is illustrated in FIG. 8. Again, for clarity, the FSM and switches controlled thereby are not shown.

FIG. 9 illustrates the circuitry enabled by FSM 148 to provide 100 Mb/s half duplex communication between nodes 130 and 132. Switch 140 closes receive data line 190b, while transmit data link 191b is enabled by switch 141, thereby providing for half duplex communication between PHY 120 and repeater 111, in support of station 130. Likewise, FSM 148 controls switches 142 and 143 to links 192b and 193b respectively, to provide half duplex communication between PHY 121 and repeater 111 in support of station 132. All other switches are open, thereby disabling communication over PHYs 122 and 123 and repeaters 112 and 113.

100 Mb/s, full duplex communication between nodes 130 and 132 is depicted in FIGS. 6 and 10, in which FSM 148 controls switches 140 and 143 to enable receive and transmit data lines 190b and 193b coupled to respective PHYs 120 and 121 for communication with 100 Mb/s repeater 111. FSM 148 further controls switches 144 and 145 to enable receive and transmit data lines 194b and 195b respectively coupled to PHYs 122 and 123 for communication with 100 Mb/s repeater 113. Both repeaters are utilized to avoid collisions that would otherwise occur if stations 130 and 132 concurrently transmitted data to the other station.

As stated above, the relays for each channel are in bypass mode at power down of the probe. Upon power up, FSM 148 is in idle state 505. Configuration of the PHYs, including Auto-Negotiation, occurs next in accordance with the appropriate IEEE standard 802.3 procedures, and the relays are opened so that the probe is in pass through mode. In pass through mode, data packets transmitted between nodes connected to the probe are monitored by the probe, rather than bypassing the probe. At this point, the probe configuration is as illustrated in FIG. 7, in which the stations communicate with each other according to the lowest priority mode of operation, e.g., 10 Mb/s data transmission speed, half duplex.

Once Auto-Negotiation is completed by each PHY to which a station is connected, and the probe is in pass through mode, the finite state machine 148 compares the modes of operation negotiated by each PHY with its respective attached station. If only a single station in the point-to-point link, e.g., station 130 or station 132, but not both, is connected to a PHY at 10 Mb/s transmission speed, then FSM 148 transitions to state 510. If both stations in the point-to-point link are connected to a PHY at 10 Mb/s, then FSM transits to state 525, and the probe configuration remains as illustrated in FIG. 7.

If a single station is connected to a PHY at 100 Mb/s transmission speed, then FSM 148 transits to state 515. If both stations are connected to a PHY at 100 Mb/s, then FSM 148 transitions to state 520. In transitioning from one state to another, FSM 148 asserts the appropriate control signals 180–183, 186 and 187, respectively coupled to switches 140–145 to control the repeaters to be used, depending on the highest common mode of operation between the stations, as determined by such factors as speed and/or duplex. Moreover, FSM 148 controls the half-duplex, full-duplex switches 150 and 152 also by asserting appropriate control signals 184 and 185, depending on the duplex negotiated by the PHYs to which the stations are connected.

What is claimed is:

1. A method for a probe to negotiate a common mode of communication between two nodes, comprising:

a) establishing a first communication path between the probe and a first node including negotiating a mode of operation with the first node;

b) establishing a second communication path between the probe and a second node including negotiating a mode of operation with the second node; and c) controlling a plurality of switches between physical layer interfaces and repeaters using a finite state machine to establish a third communication path coupling the first and second communication paths to provide a negotiated common mode of operation between the first node and the second node.

2. The method of claim 1, wherein controlling the plurality of switches comprises negotiating a speed of a transmission of data over the first communication path between the probe and the first node.

3. The method of claim 1, wherein controlling the plurality of switches comprises negotiating one of half duplex and full duplex communication over the first communication path between the probe and the first node.

4. The method of claim 1, wherein the common mode of operation between the first node and the second node is the best mode of operation available between the first node and the second node.

5. A probe that negotiates a common mode of communication between two nodes, comprising:

means for establishing a first communication path between the probe and a first node including negotiating a mode of operation with the first node;

means for establishing a second communication path between the probe and a second node including negotiating a mode of operation with the second node; and means for controlling a plurality of switches between physical layer interfaces and repeaters using a finite state machine to establish a third communication path coupling the first and second communication paths to provide a negotiated common mode of operation between the first node and the second node.

6. An article of manufacture comprising a machine readable medium having a plurality of machine readable instructions stored thereon, wherein the instructions, when executed by a processor, cause the processor to:

a) establish a first communication path between a probe and a first node including negotiating a mode of operation with the first node;

b) establish a second communication path between the probe and a second node including negotiating a mode of operation with the second node; and c) control a plurality of switches between physical layer interfaces and repeaters using a finite state machine to establish a third communication path coupling the first and second communication path to provide a negotiated common mode of operation between the first node and the second node.

7. The article of manufacture of claim 6, wherein the instructions that cause a processor when executed to control the plurality of switches cause the processor when executed to negotiate a speed of a transmission of data over the first communication path between the probe and the first node.

8. The article of manufacture of claim 6, wherein the instructions that cause the processor when executed to control the plurality of switches cause the processor when executed to negotiate one of half duplex and full duplex communication over the first communication path between the probe and the first node.

9. The article of manufacture of claim 6, wherein the common mode of operation between the first node and the second node is the best mode of operation available between the first node and the second node.

10. A probe comprising:
   physical layer interfaces coupled to first and second nodes to establish first and second communication paths;
   a plurality of switches coupled to the physical layer interfaces and repeaters; and
   a finite state machine coupled to the physical layer interfaces to control the plurality of switches to establish a third communication path coupling the first and second communication paths through the physical layer interfaces and at least one of the repeaters, the third communication path providing a negotiated common mode of operation between the first node and the second node.

11. The probe of claim 10 wherein the finite state machine asserts control signals to the switches and enables the repeaters to be used according to a highest common mode of operation between the first and second nodes.

12. The probe of claim 11 wherein the highest common mode of operation is determined by one of a transmission speed and a duplex mode.

13. The probe of claim 10 wherein the finite state machine comprises:
   an idle state upon power up;
   a first state corresponding to only one of the first and second nodes operating at a low transmission speed; and
   a second state corresponding to only one of the first and second nodes operating at a high transmission speed.

14. The probe of claim 10 wherein the finite state machine comprises:
   a third state corresponding to both of the first and second nodes operating at a low transmission speed; and
   a fourth state corresponding to both of the first and second nodes operating at a high transmission speed.

* * * * *